May 16, 1961 J. C. CLARK 2,984,433
FISHING REEL

Filed Nov. 4, 1957 3 Sheets-Sheet 1

INVENTOR.
JOSEPH C. CLARK
BY Lloyd J. Andres

May 16, 1961  J. C. CLARK  2,984,433
FISHING REEL

Filed Nov. 4, 1957  3 Sheets-Sheet 2

INVENTOR.
JOSEPH C. CLARK
BY

May 16, 1961     J. C. CLARK     2,984,433
FISHING REEL
Filed Nov. 4, 1957     3 Sheets-Sheet 3
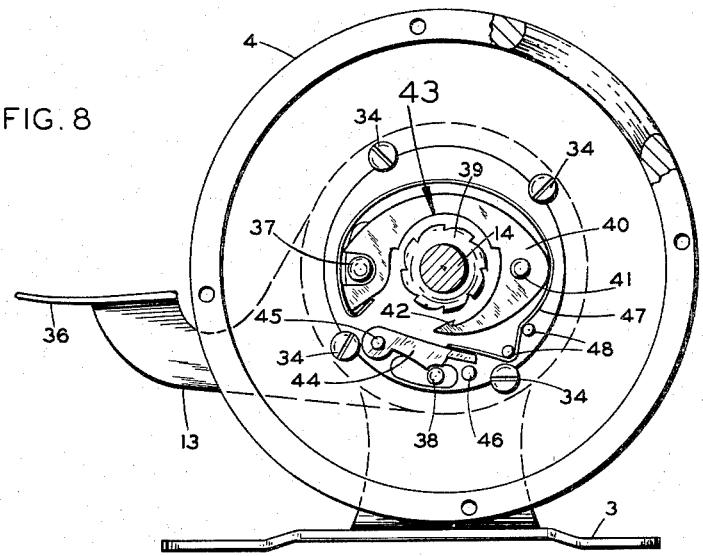
FIG. 8
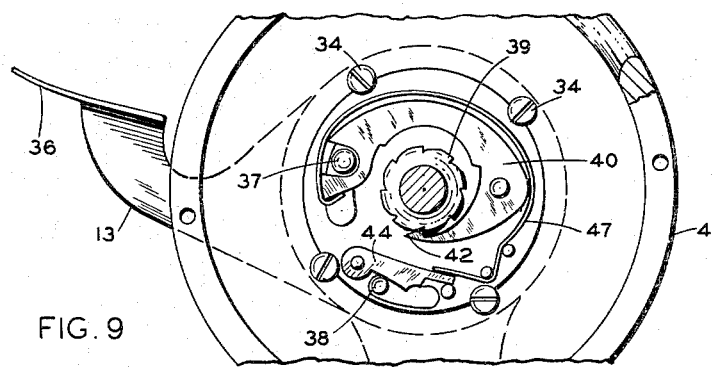
FIG. 9
FIG. 11
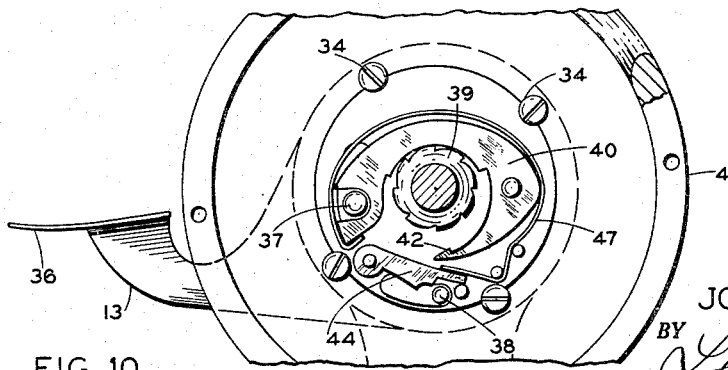
FIG. 10
INVENTOR.
JOSEPH C. CLARK
BY

2,984,433
FISHING REEL

Joseph C. Clark, 4843 Backacher Lane, Orlando, Fla.

Filed Nov. 4, 1957, Ser. No. 694,451

1 Claim. (Cl. 242—84.54)

This invention relates in general to fishing reels and more particularly to a general purpose casting reel whereby the hand holding the fishing rod has complete control of the reel and line during casting, playing, and retrieving operations.

Fishing reels previous to this invention usually included complicated and costly mechanism for minimizing back lashing, level winding and required a relatively high degree of skill when used, particularly when casting and a variable drag is applied by pressing the thumb of the hand into direct contact with the line on the spool. Furthermore, snubbing and drag devices on previous reels required adjustment that could not be made during the casting operation and were not under the tactual control of the casting hand.

The present invention overcomes the above objections and disadvantages by the provision of a novel form of spool and housing therefore and the provision of a control mechanism responsive to a control lever positioned to be operated by the thumb of the hand holding the rod thus providing for the complete sensitive and positive control of the line during casting, playing and retrieving operations, the construction of which is a principal object of the invention.

Another object of the invention is the provision of a thumb operated lever movable to three positions corresponding to a free spool, a variable degree of drag and a locked spool including a detent means for distinguishing said positions.

Another object of the invention is the provision of an automatic clutch for releasing the winding crank during casting in combination with a drag means for adjustably applying an auxiliary drag on said spool.

A further object of the invention is the construction of a spool and housing therefore proportioned to inherently prevent back-lash and the resulting entanglement of the line including an automatic disengaging clutch for releasing the winding crank and its members to provide desirable low inertia rotation of the spool during casting.

These and other objects and advantages in one embodiment of the reel are described and shown in the following specification and drawing in which:

Fig. 8 is an enlarged internal view of the side opposite that shown in Fig. 4 with elements in neutral position.

Fig. 9 is a fragmentary view the same as Fig. 8 with elements in locked position.

Fig. 10 is the same as Fig. 9 with elements in snubbing position.

Fig. 11 is a perspective view of the control lever shown in Figs. 1 and 2.

Figure 1:
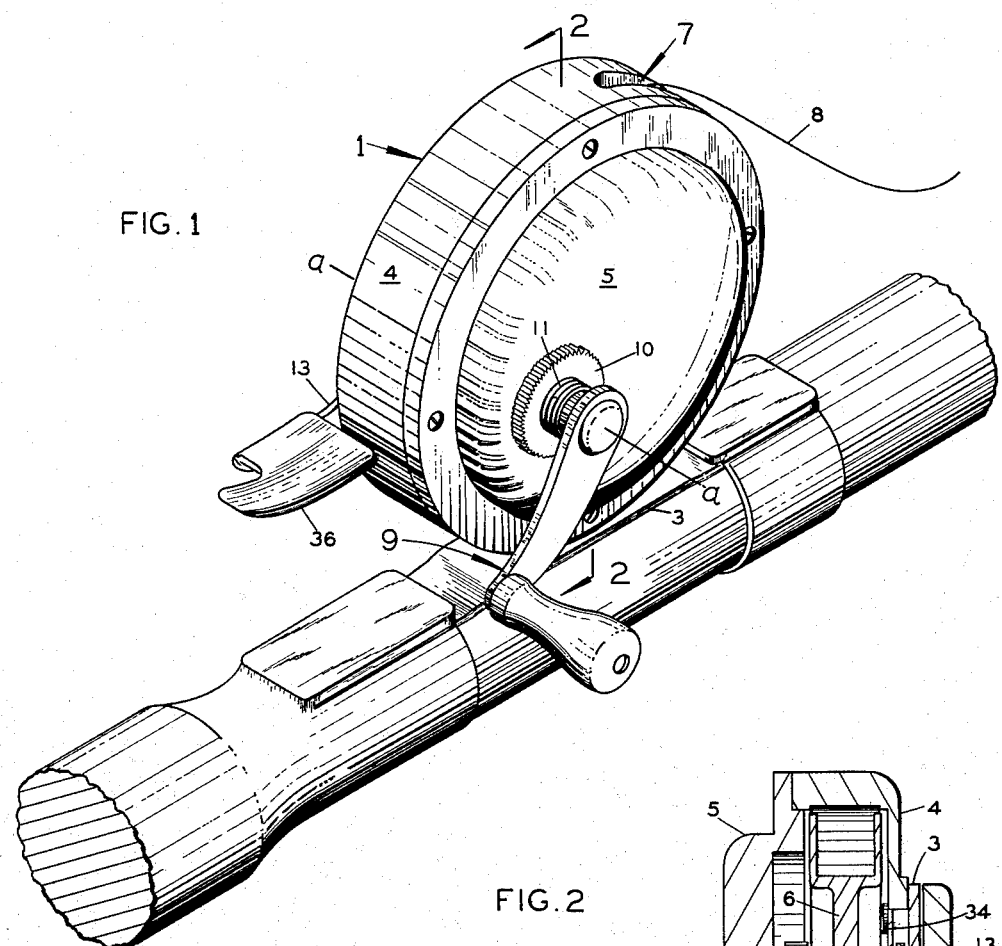
Fig. 1 is a perspective view of the reel attached to a conventional casting rod.

Referring to Fig. 1, the reel 1 is shown secured to a conventional casting rod by mounting bracket 3 secured to the housing of the reel and retained on the rod by conventional ferrules as shown. The reel frame or housing 4 and its cover 5, retained by screws as shown totally enclose the spool 6 shown in Fig. 3. A small aperture 7 provides an outlet for the line 8.

Figure 2:
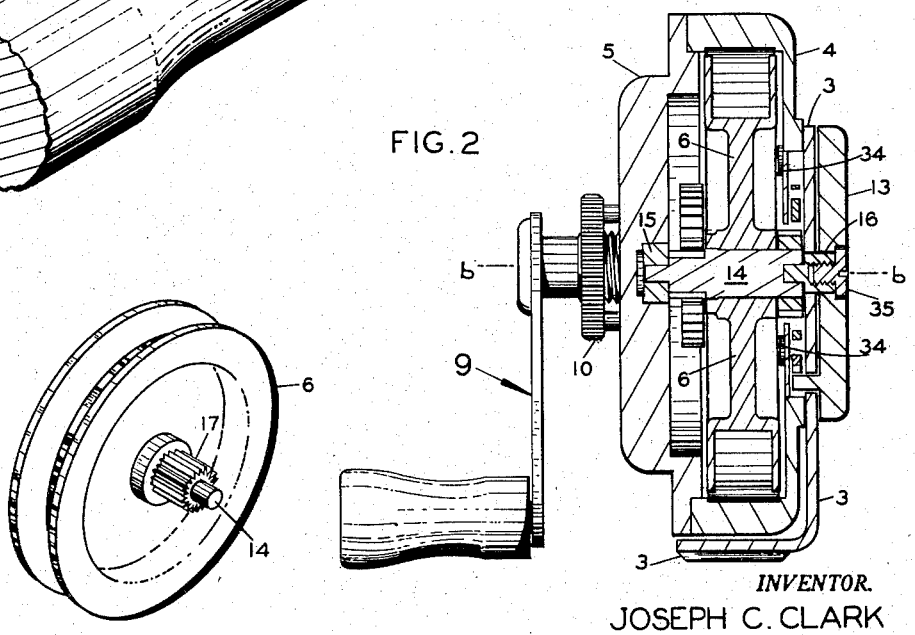
Fig. 2 is a cross-sectional view of the reel taken through section line 2—2, Fig. 1.

Referring to Figs. 1 and 2, a crank assembly 9 projects from and is journalled in cover 5 for rotation about axis $a$—$a$ in convenient position for right hand use as shown. A knurled brake adjustment nut 10 is threaded on a fixed hub 11 through which the crankshaft 12 of the handle is journalled.

A control lever 13 pivotally secured to the side of the housing 4 for movement about axis $b$—$b$ and terminates in a plate 36 conveniently positioned for operation by the thumb of the hand grasping the rod.

Figure 3:
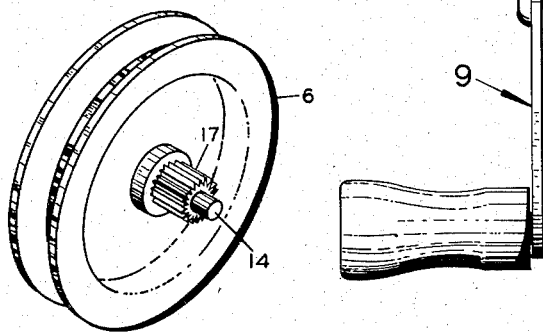
Fig. 3 is a perspective view of the spool shown in Fig. 2.

Referring to Figs. 2 and 3, the spool 6, is provided with an axle 14 journalled in bearing 15 in cover 5 and on an opposite coaxial bearing 16 secured in bracket 3. A pinion gear 17 is coaxially secured on one side of axle 14 for coupling the crank and a brake to be hereinafter described.

Figure 5:
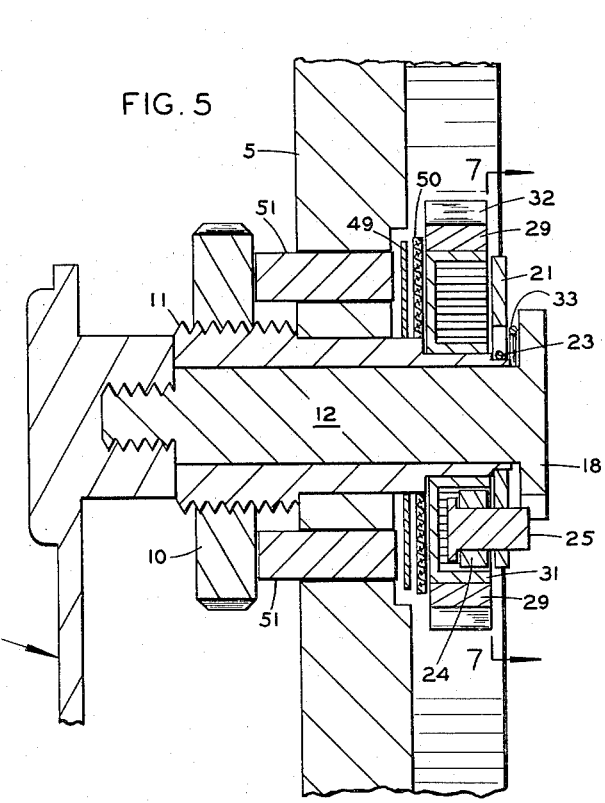
Fig. 5 is a fragmentary enlarged cross-sectional view taken through section line 5—5, Fig. 4.
Figure 6:
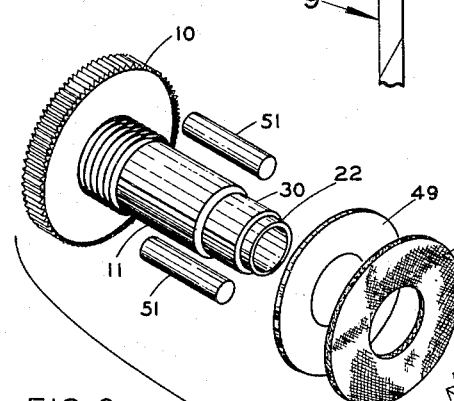
Fig. 6 is a perspective exploded view of elements shown in Fig. 5.
Figure 7:
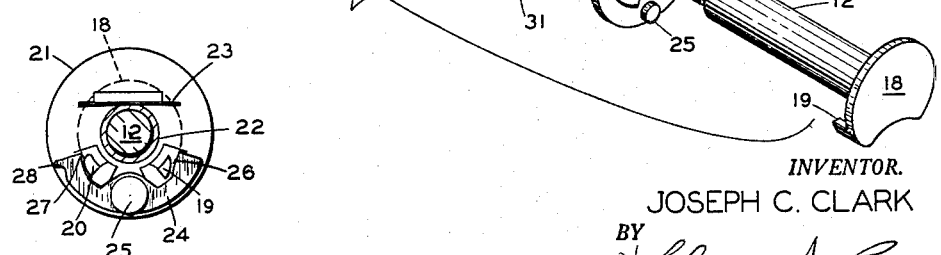
Fig. 7 is a cross-sectional view taken through section line 7—7, Fig. 5.

Referring to Figs. 5, 6 and 7, the hub 11 secured in cover 5 serves as a bearing for the crankshaft 12 which is to be rotated by the crank assembly 9 threaded thereon. The inner end of the shaft 12 terminates in a head portion 18 having a pair of spaced abutments 19 and 20 projecting therefrom better shown in Figs. 6 and 7.

A clutch drive member 21, journalled on quill 22 integral with hub 11 and is provided with a bias spring 23, retained in slots in member 21 by opposite ends thereof, for the purpose of applying friction resisting free rotation of member 21 on quill 22.

A pawl 24, Fig. 7, is pivotally secured on member 21 by shoulder stud 25.

Cam surfaces 26 and 27 on the inner end surfaces of pawl 24 are adaptjed to be alternately operated by abutments 19 and 20 for the purpose of projecting and retracting tooth 28 as shown.

A driven clutch member 29, Figs. 6 and 7, is adapted to rotate on a bearing surface 30 of hub 11 and is provided with a planar friction surface on one side thereof and with a plurality of internal pawl teeth 31 for intermittent engagement with tooth 28. The outer periphery of the member is provided with gear teeth 32 permanently meshed with pinion 17 on spool 6 in an appropriate ratio for increasing the ratio of rotation between crank assembly 9 and spool 6.

Figure 4:
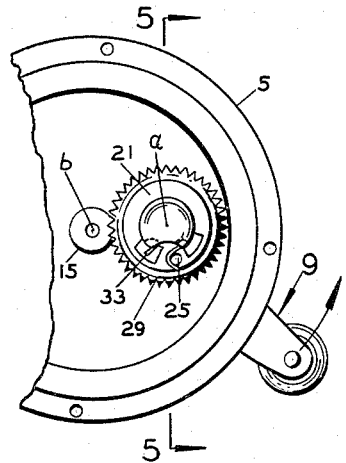
Fig. 4 is a fragmentary internal elevation of the crank side of the reel shown in Fig. 1.

Referring to Figs. 4 and 5, a torsion spring 33 is positioned between the head 18 and the member 21 and adapted to bear against abutment 19 and the inner end of stud 25 as shown for normally urging abutment 19 against cam surface 26 for retracting tooth 28, thus permitting spool 6 and the driven clutch member 29 to rotate freely without rotating clutch member 21 shaft 12 and the crank assembly 9.

Referring to Figs. 4 and 7, when the crank assembly 9 is moved in the direction shown by arrow, abutment 20 will engage cam surface 27 and overcome tension of spring 33 by virtue of the frictional bias of the spring 23 restraining the rotation of member 21 on quill 22 and project tooth 28 into engagement with any one of the teeth 31 in driven member 29 for rotating the spool and winding the line thereon.

When the crank 9 is released, it is apparent that the spring 33 will provide opposite relative movement between shaft 12 and clutch member 21 and free the crank assembly from the drive member 29 by the camming action of abutment 19 against cam surface 26.

Referring to Figs. 1, 5 and 6, an adjustable auxiliary brake for applying different fixed degrees of drag to the spool is positioned between the cover 5 and the outer face of the driven clutch member 29. A brake disc 49, is slideably fitted over hub 11 with a friction washer 50 interposed between the disc and the face of member 29. A pair of pins 51—51 are slideably retained in cover 5 equi-distant from opposite sides of hub 11 and adapted for movement parallel thereto. Thus it is apparent that when the brake nut 10 is rotated on threaded hub 11 toward the cover 5, the pins 51—51 will bear against disc 49 and urge the friction washer 50 into engagement with member 29 and since member 29 is permanently geared to the spool 6, the friction thus developed will provide drag for the spool.

Referring to Fig. 8, the housing 4 is secured to bracket 3 by screws 34 as shown. The control lever 13 is secured for movement about axis b—b, Fig. 2, by shoulder screw 35. The lever is provided with a thumb plate 36 conveniently positioned for vertical movement by the thumb of the operator. Pins 37 and 38, better shown in Fig. 11, are secured in lever 13 and project through appropriate apertures in bracket 3 for operating and combination means for snubbing and locking the spool 6.

A combination brake and pawl wheel 39 is coaxially secured to the spool axle 14 on the end opposite that shown in Fig. 3.

A combination brake and pawl member 40 is pivotally secured to bracket 3 on a pin 41 secured therein. The operating pin 37 is loosely straddled by member 40 as shown. One end of member 40 terminates in a lock projection 42, adapting for locking engagement with wheel 39. A braking surface 43 of member 40 is adapted for frictional contact with the periphery of wheel 39 when moved into contact therewith.

A spring 47 retained by a pair of fixed pins 48 in bracket 3 is shaped to engage one end of member 40 and the outer end of latch 44 as shown.

The spring 47 serves a dual purpose of urging the control lever 13 into neutral position with the braking surface 43 out of contact with wheel 39 and for urging latch 44 into its neutral detented position as shown.

In operation, and under the assumption that the line 8 is wound on the spool, the reel may be locked by moving the lever 13 upward by the thumb of the hand holding the rod 2. Then referring to Figs. 8 and 9, pin 37 will move upward and rotate member 40 about pin 41 and cam into engagement the projection 42 with any one of the notches in wheel 39. Simultaneously the pin 38 will cam against latch 44 and by virtue of the restraining action of spring 47, the spool will be in locked position, shown in Fig. 9.

When casting with the rod, the thumb is positioned above plate 36 and the lever 13 depressed to the position shown, Fig. 10, thus locking the line and lure for the casting stroke. At the desired instant in the forward casting movement, the thumb permits plate 36 to resume its neutral position shown, Fig. 8, and as the lure approaches the target area tactile downward pressure on the plate 36 will move the braking surface 43 of the member 40 into frictional contact with wheel 39 against the restraining action of spring 47 which will snub the rotation of the spool 6 and thus aid the accuracy of the cast. When a catch is made, the mere movement of the thumb against plate 36 will provide the necessary sensitive variable snubbing for playing the line prior to retrieving.

The detent action of latch 44 is provided to prevent the lever 13 from shifting from snubbing position to the lock position shown in Fig. 9.

The reel is shifted to lock position by the deliberate action of raising the lever with the thumb for transport or storage or when the rod is used in trolling. In the latter event, a catch will cause the rod to flex and thus prevent the reel from running away and the convenient movement of the control lever by the thumb will immediately apply a desirable snubbing action.

It is to be noted that during the casting, any loose turns unwinding from the spool will not become entangled, commonly called back-lash, for the reason that the space surrounding the spool is enclosed by the housing 4 except for the aperture 7 through which the line is fed, thus preventing overwound loops during the period of the casting.

The clearance between the edges of the spool flanges and the housing 4 is intended to be sufficiently close to prevent the line from entering therein.

During the above casting operation, the crank remains disconnected from the driving connection with the spool by the automatic action of the clutch as shown in Fig. 7.

The auxiliary brake is readily adjusted by rotation of nut 10 which will apply resistant friction to clutch member 29 and thence through the gearing to the spool. This adjustment overcomes the inertia of the spool during the cast and provides for a free running line without entanglement thereof.

When the crank is rotated to retrieve the line, abutment 20 shown in Fig. 7 will overcome the bias of torsion spring 33, by virtue of the frictional resistance of spring 23 in pressure contact with quill 22 and move pawl 24 into engagement with one of the teeth 31 in member 29. Then rotation of the crank will rotate member 29 and the spool 6 through the fixed mesh of the teeth 32 with pinion 17.

It is to be noted that when rotation of the crank is stopped, the spool is automatically disconnected by the reverse operation of the pawl 24 previously described.

Having described my invention, I claim:

In a casting reel of the character described means forming a frame, a spool means journalled for rotation in said frame for casting and rewinding a line wound thereon when operated, a coaxial spool gear on one side of said spool means, a fixed hub in said frame having a bore therethrough a spool drive member journalled for rotation on said hub and having circumferential gear teeth meshed with said spool gear and, including at least one pawl tooth projecting therefrom, a clutch member journalled for rotation on said hub including a friction means biased between said hub and said clutch member for providing predetermined frictional resistance to the rotation thereof, a pawl pivoted on said clutch member adapted for movement from an idle position to a drive position in the path of rotation of said tooth for driving engagement therewith when operated, a drive shaft journalled for rotation in the said bore of said hub with a manual crank means fixed to one end and an abutment means fixed to the opposite end thereof for rotating said clutch member and operating said pawl, a spring means biased between said shaft and pawl for urging the latter into said idle position, said abutment means adapted to engage and move said pawl from said idle position into engagement with said pawl tooth against the restraining action of said spring means and the said resistance of said friction means for rotating said drive member and said spool means when said crank means is manually rotated in one direction and whereby said abutment means will disengage said pawl from said tooth when the rotation of the said crank means is reversed.

References Cited in the file of this patent

UNITED STATES PATENTS

| Number | Name | Date |
|---|---|---|
| 850,580 | Holzmann | Apr. 16, 1907 |
| 929,867 | Meisselbach et al. | Aug. 3, 1909 |
| 1,663,800 | Kautzky | Mar. 27, 1928 |
| 1,829,006 | Kautzky | Aug. 4, 1930 |
| 1,836,755 | Hirsch | Dec. 15, 1931 |
| 2,257,521 | Babcock | Sept. 30, 1941 |
| 2,300,650 | Clinton | Nov. 3, 1942 |
| 2,309,146 | Whistler | Jan. 26, 1943 |
| 2,321,820 | Kachel | June 15, 1943 |
| 2,477,073 | McGill | July 26, 1949 |
| 2,503,366 | Weckel | Apr. 11, 1950 |
| 2,547,330 | Lauterbach | Apr. 3, 1951 |
| 2,553,589 | Hull | May 22, 1951 |
| 2,587,257 | Weisblatt | Feb. 26, 1952 |
| 2,772,839 | Morton | Dec. 4, 1956 |